March 18, 1969 P. DOGADKO ET AL 3,433,208

TRIGGERING CIRCUIT

Filed Feb. 14, 1967

Inventors
ARTHUR G. HUFTON
PETER DOGADKO
BY Mueller, Aichele & Rauner
ATTYS.

United States Patent Office 3,433,208

Patented Mar. 18, 1969

3,433,208

TRIGGERING CIRCUIT

Peter Dogadko, Chicago, and Arthur G. Hufton, Elk Grove, Ill., assignors to Motorola, Inc., Franklin Park, Ill., a corporation of Illinois Filed Feb. 14, 1967, Ser. No. 615,987

U.S. Cl. 123—148 6 Claims

Int. Cl. F02p 3/04

ABSTRACT OF THE DISCLOSURE

A circuit in which the input electrode of a trigger transistor is coupled to the ignition capacitor and the output electrode of the trigger transistor is connected to a tap on a transformer secondary winding in the output circuit of a blocking oscillator. The discharge of the ignition capacitor triggers the trigger transistor into conduction through the tapped portion of the transformer which in turn causes the blocking oscillator to fire and charge the capacitor.

*Background of the invention*

Many ignition systems for internal combustion engines utilize electronic circuitry not only to produce high voltage ignition pulses in the ignition coil but also to recharge the discharge capacitor after each ignition firing in a capacitor discharge type system. One such system employs electronic circuitry for recharging the capacitor which requires the use of a transistor having a high rated power output for initially triggering the blocking oscillator. This type of transistor is relatively expensive. Furthermore, this high power output transistor conducts at all times and thereby permits a potential to be applied at all times across the control devices for initiating action to selectively fire the spark devices. The application of a potential at all times (after the initial firing of the ignition system) across the control devices is inefficient and furthermore there is always a chance that one of the control devices would lock on because of this potential and result in a ragged operation of the internal combustion engine.

*Summary of the invention*

It is an object of this invention to provide an improved and economical electronic circuit for charging the capacitor in a capacitor discharge system.

It is another object to provide a capacitor discharge ignition system wherein the potential is removed from the control devices after the capacitor is discharged.

A feature of the invention is the provision in a pulsing circuit for charging a capacitor of a transformer having a tapped first winding and second and third windings which cooperate with a semiconductor device such as a transistor to form an oscillator circuit to periodically charge the capacitor, and which is rendered conductive by operation of one of a plurality of control devices.

Another feature of the invention is the provision, in a capacitor discharge spark ignition system for an internal combustion engine, of a low power transistor which is rendered conductive when the capacitor is discharged and applies current to a portion of a winding of an oscillator to initiate action which charges the discharge capacitor.

A further feature of the invention is the provision, in a capacitor discharge spark ignition system for an internal combustion engine, of a trigger transistor and an oscillator transistor so interconnected that both transistors are nonconducting until periodically actuated by discharge of the capacitor by one of a plurality of control devices, and wherein there is no potential across the control devices when the capacitor is discharged.

In practicing the invention there is provided a capacitor recharging circuit used in a pulsing system, having a transformer with three windings two of which are coupled to a transistor to form a blocking oscillator. One of the windings contains a tap to which is connected a trigger amplifier for triggering the blocking oscillator into operation. The trigger amplifier is further connected to the junction of the discharge capacitor and a silicon controlled rectifier for sensing the voltage across the capacitor. When the silicon controlled rectifier is triggered it quickly discharges the capacitor through the primary of a coil to product a pulse therein. As the voltage across the capacitor decreases, the trigger amplifier starts conducting through a portion of the tapped winding, and a signal is inductively coupled through one of the secondary windings to trigger the blocking oscillator into operation. The total primary winding is connected in the output circuit of the blocking oscillator so that the decay in current through the primary winding, after the blocking oscillator saturates and then approaches cut off, induces a voltage in the other secondary winding. The capacitor is connected through a diode across this other secondary winding and is charged up by the voltage induced therein. The tapped primary winding allows the use of a low power transistor for the trigger amplifier since the tap keeps the voltage across the trigger amplifier at a relatively low value. The silicon controlled rectifier will not lock on since the anode voltage of the silicon controlled rectifier will drop to zero when the capacitor has completely discharged.

The charging circuit can be used in a capacitor discharge ignition system, with a plurality of ignition coils connected through separate semiconductor switches to the same discharge capacitor. The semiconductor switches can be silicon controlled rectifiers actuated by a suitable switching system synchronized with the internal combustion engine.

*Detailed description*

Figures 1, 2:
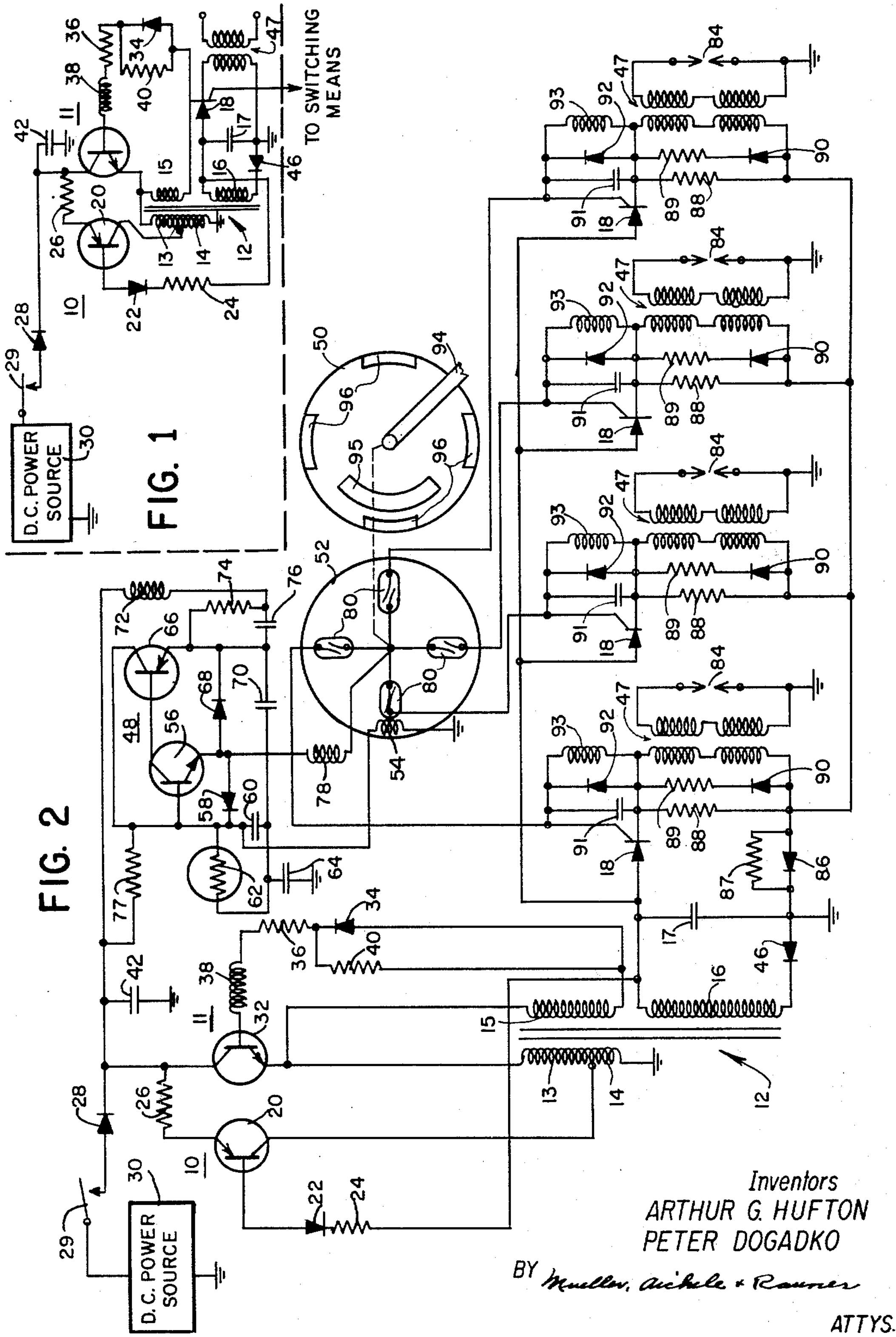
FIG. 1 is a circuit diagram showing the capacitor charging and discharging circuit of the invention.
FIG. 2 is a circuit diagram showing the circuit of the invention used in conjunction with the other essential elements of a capacitor-discharge spark ignition system.

The electronic circuitry of the capacitor charging and discharging system, as shown in FIG. 1, includes a trigger amplifier 10, a blocking oscillator 11, a transformer 12 having a tapped winding 13, 14 and windings 15 and 16, a discharge capacitor 17 and controlled rectifier 18. The trigger amplifier 10 includes PNP transistor 20 whose collector is connected to the tap of tapped winding 13, 14 and through winding 14 to a reference potential so that its output can be developed across winding 14. The base of transistor 20 is connected in series through diode 22, resistor 24 and discharge capacitor 17 to a reference potential, so that the potential across capacitor 17 upon discharge will trigger transistor 20 into conduction. The emitter of transistor 20 is connected in series through resistor 26, diode 28 and switch 29 to a DC power source 30.

The blocking oscillator includes NPN transistor 32, the emitter of which is connected in series through tapped winding 13, 14 to the reference potential so that its output can be developed across winding 13, 14. The emitter of transistor 32 is further connected in series through winding 15, diode 34, resistor 36 and coil 38 to the base of transistor 32 in order to inductively couple the output voltage of transistor 20 through winding 15 to the base of transistor 32. The diode 34 is bypassed by resistor 40. The collector of transistor 32 is connected to the power source 30 through diode 28 and switch 29, and is also bypassed to the reference potential by capacitor 42.

Discharge capacitor 17 is connected in series with rectifying diode 46 across the transformer winding 16 for charging the same. Capacitor 17 is connected through silicon controlled rectifier 18 to the primary winding of transformer 47 and is discharged therethrough when rectifier 18 conducts.

The operation of the capacitor discharge system of FIG. 1 is as follows. When switch 29 is initially closed the positive potential from the DC power source is applied through switch 29, diode 28 and resistor 26 to the emitter of transistor 20 with the result that the transistor 20 starts conducting through portion 14 of tapped winding 13, 14. The build-up of current through portion 14 induces a voltage into winding 15 which drives the base of transistor 32 positive with respect to the emitter. Transistor 32 starts conducting heavily through tapped winding 13, 14 and drives its base even more positive with respect to its emitter thereby increasing its conduction even more. This regeneration continues until transistor 32 reaches saturation. At this time, since the current through the transistor is no longer increasing, the induced voltage in winding 15 starts to decrease. This causes the current flow of transistor 32 through tapped winding 13, 14 to decrease, which, in turn further decreases the induced voltage in winding 15. This regenerative action rapidly continues until the transistor is cut off.

While this regenerative action is rapidly causing a reduction in current through tapped winding 13, 14, a voltage of the proper polarity is induced in winding 16 and charges capacitor 17. The rise time of the blocking oscillator plus the charge time for the capacitor is less than 1 millisecond. (When utilized in an ignition system, this time is far less than the time between two successive ignitions, even at high engine speeds.) The positive potential on the capacotor reverse biases and cuts off transistor 10 and maintains it in a cut off condition until the capacitor is discharged.

When the silicon controlled rectifier 18 is triggered into conduction, it discharges the capacitor 17 through the primary of transformer 47. As the capacitor 17 starts to discharge, the positive potential on the base of transistor 20 starts to decrease. When the base potential decreases to the point where transistor 20 becomes forward biased, the transistor starts conducting. The subsequent operation of the capacitor recharging system is the same as has been previously described.

The invention may be used advantageously in an ignition system for a four cylinder internal combustion engine, as illustrated in FIG. 2. Elements of the system of FIG. 2 which are the same as in FIG. 1 are identified by the same numerals. FIG. 2 includes the discharge capacitor 17 and four ignition circuits each having a silicon controlled rectifier 18 for triggering the discharges of the capacitor to produce the firing sparks for the four cylinders of the engine. The blocking oscillator 11 is again coupled to the discharge capacitor 17 for charging the same. Additional components used in the ignition system are a preamplifier 48 for actuating the rectifiers 18, and a pulsing and switching mechanism including a rotary disc 50, and a stationary disc 52.

The preamplifier 48 includes a pick-up coil 54 connected between the base of transistor 56 and the reference potential. A magnetic member moves past coil 54 to induce pulses therein, as will be further described. The base of transistor 56 is further connected via the parallel combination of diode 58, capacitor 60 and thermistor 62 to capacitor 64, which is connected to the reference potential. The collector of transistor 56 is connected to the base of transistor 66, and the base of transistor 56 is connected to the collector of transistor 66. The emitters of both transistors 56 and 66 are connected together through the parallel combination of diode 68 and capacitor 70 so that the base current of transistor 66 is the emitter current of transistor 56. Potential is applied to the emitter of transistor 66 through switch 29, diode 28, coil 72 and resistor 74, with the capacitor 76 being connected in parallel with resistor 74. In addition potential is applied through resistor 77 to the base of transistor 56 and the collector of transistor 66. The emitter of transistor 56 is also connected to capacitor 64 and further connected through coil 78 to the common junction of reed switches 80 which connect the preamplifier 48 to the control electrodes of the respective silicon controlled rectifiers 18.

A high voltage ignition coil or transformer 47 is provided for each cylinder, and the secondary winding of each transformer 47 is connected across a respective spark plug 84. The primary windings of the transformers 47 are connected via a common diode 86 to the plate of the capacitor 17, and separately via silicon controlled rectifiers 18 to the other plate of capacitor 17 so that when the individual silicon controlled rectifiers are triggered they will selectively discharge the capacitor through their associated primary windings of high voltage transformers 47. Diode 86 is bypassed by resistor 87. The resistor-diode combination 88, 89 and 90 is connected in parallel with the primary winding of transformer 47. The parallel combination of capacitor 91, diode 92 and coil 93 is connected between the control electrode of each silicon controlled rectifier 18 and one side of the primary of transformer 47. Each of the control electrodes of the silicon controlled rectifiers 18 is connected individually to its respective reed switch 80, so that each silicon controlled rectifier may be selectively triggered.

The combination of the rotary disc 50 and the stationary disc 52 is utilized for timing the ignition pulses to the engine position and distributing the pulses to the four cylinders. The four reed switches 74 are spaced equidistantly apart on a circumference of the stationary disc which also supports pick-up coil 54. The rotary disc is positioned opposite to the stationary disc and is coupled to the engine crank shaft 94 for rotation therewith. Mounted on the rotary disc 50 is a magnet 95 and four shaped magnetic pole elements 96. Magnet 95 covers a 100° segment section of a circle. The magnet is concentrically mounted on the rotary disc and displaced from the outer circumference thereof. As the rotary disc is rotated, the magnet passes over each of the reed switches 80 in turn. Since the four magnetically operated reed switches 80 are spaced 90° apart, two adjacent reed switches are closed for an overlapping portion of 10° when the magnet is rotating and passes the magnetically operated reed switches. The four shaped pole elements are mounted on the circumference of rotary disc 50 for varying the magnetic flux in the main pick-up coil 54. The four shaped pole elements describe an arc length of about 40° and are disposed equidistantly apart along the outer circumference of the rotary disc. As each shaped pole element passes over the pick-up coil 54 a voltage is induced therein.

In considering the operation of the invention incorporated in the ignition system it will be assumed that capacitor 17 is charged in the manner which had been previously described. As the disc 50 rotates, magnet 95 will start to pass one of the reed switches 80, the reed switch will close and remain closed until after the magnet has rotated through 100°. During this period of time one of the shaped pole elements will pass pick-up coil 54 and induce a voltage in the pick-up coil which will be coupled to the base of transistor 56 in preamplifier 48 turning it on. When transistor 56 is turned on it conducts current from the emitter of transistor 66 through the base and thus turns on transistor 66. Since the collector of transistor 66 is connected to the base of transistor 56, its collector current is drawn from the base of transistor 56 which holds it on. When transistor 56 is locked on, the capacitor 76 charges up rapidly and provides a sharp triggering pulse at the control electrode of the silicon controlled rectifier. The silicon controlled rectifier will be gated on to rapidly discharge the capacitor 17 through diode 86 and through the primary of high voltage transformer 47. As soon as the capacitor 76 becomes fully charged, the resistor 74 bypassing capacitor 76 will conduct insufficient current to maintain the flow of current through transistors 56 and 66 so that they switch off. The capacitor 76 now discharges in less than 1 millisecond through resistor 74 and becomes ready for the next triggering operation.

After discharge of capacitor 17, the transistor 20 of the trigger amplifier will be forward biased and will start to conduct through winding 14 of tapped winding 13, 14, thereby initiating the next charging cycle for capacitor 17, as previously described.

It may, therefore, be seen that the invention provides an improved capacitor discharged recharging circuit in an ignition system for an internal combustion multicylinder engine which performs a distributorless spark distribution, in the quiescent condition of the ignition circuit between successive pulses. All of the transistors are non-conducting for some portion of time between successive pulses. This provides a more efficient operation and also prevents the possibility of false and erratic triggering of the ignition system. By using a tapped winding 13, 14 in the transformer, transistor 20 can be a low power transistor, further increasing the efficiency and decreasing the cost of the capacitor recharging system.

We claim:

1. In a pulsing circuit having capacitor means, and circuit means for discharging the capacitor means to produce high voltage pulses, a charging circuit for said capacitor means including in combination, a transformer having first, second and third coupled windings, means including a semiconductor device connected to said first and second windings and together therewith forming a blocking oscillator, semiconductor switch means, first circuit means coupling said switch means to said semiconductor device for applying current thereto to initiate operation of the blocking oscillator, second circuit means connecting said third winding to the capacitor means for charging the same from oscillations developed in said transformer, said semiconductor switch means being further connected to the capacitor means and being responsive to the discharge thereof to energize said semiconductor device thereby causing operation of said blocking oscillator to recharge the capacitor means.

2. The circuit of claim 1 wherein said semiconductor switch means includes transistor means having base, emitter and collector electrodes, coupling means connecting the capacitor means to said base electrode, and said first circuit means includes said first transformer winding having a tap thereon connected to said collector electrode, and the charging circuit further including means for applying a voltage to said emitter electrode.

3. The circuit of claim 1 wherein said semiconductor device includes base, emitter and collector electrodes, means for applying a voltage to said collector electrode, means including said second winding connected between said base and emitter electrodes of said semiconductor device, and said emitter electrode being further connected through said first winding to a reference potential.

4. In a spark ignition system for an internal combustion engine containing a pulsing circuit having a discharge capacitor and a plurality of ignition coil means responsive to the discharge of the capacitor by circuit means for producing high voltage ignition pulses for the internal combustion engine, a charging circuit for the capacitor including in combination, transformer means having first, second and third windings, transistor means coupled to said first and second windings to form an oscillator, semiconductor triggering means coupled to the capacitor and activated in response to the discharge of the capacitor, first circuit means connecting said semiconductor triggering means to said transistor means for supplying a current pulse thereto to trigger said oscillator into conduction, and second circuit means connecting said third winding to the capacitor so that said capacitor is charged by oscillations developed in said third winding.

5. The circuit of claim 4 wherein said first winding has a tap thereon, and wherein said semiconductor triggering means includes a transistor having base, emitter and collector electrodes, first coupling means connecting the capacitor to said base electrode and responsive to the discharge of the capacitor for rendering said transistor conductive, said first circuit means includes said first winding of said transformer means, said collector electrode being connected to a tap on said first winding for supplying a current pulse through a portion of said first winding to initiate operation of said oscillator, and said emitter electrode coupled to a source of voltage.

6. The circuit of claim 5 wherein said transistor means includes a transistor having base, emitter and collector electrodes, second coupling means including said second winding connecting said base electrode to said emitter electrode, and means for applying a voltage to said collector electrode, said emitter electrode being further connected through said first winding to provide current flow therethrough to develop a voltage across said third winding to charge the capacitor.

References Cited

UNITED STATES PATENTS

| | | |
|---|---|---|
| 3,263,124 | 7/1966 | Stuermer. |
| 3,302,629 | 2/1967 | Shano. |

LAURENCE M. GOODRIDGE, *Primary Examiner*.

U.S. Cl. X.R.

315—209